(12) United States Patent
Oshima

(10) Patent No.: US 7,076,280 B2
(45) Date of Patent: Jul. 11, 2006

(54) FOLDABLE TYPE CELLULAR TELEPHONE

(75) Inventor: Kazuyoshi Oshima, Naruto-machi (JP)

(73) Assignee: Sugatsune Kogyo Co., Ltd., Tokyo (JP)

( * ) Notice: Subject to any disclaimer, the term of this patent is extended or adjusted under 35 U.S.C. 154(b) by 332 days.

(21) Appl. No.: 10/110,925

(22) PCT Filed: Jun. 7, 2001

(86) PCT No.: PCT/JP01/04826

§ 371 (c)(1),
(2), (4) Date: Apr. 18, 2002

(87) PCT Pub. No.: WO02/16718

PCT Pub. Date: Feb. 28, 2002

(65) Prior Publication Data

US 2002/0150236 A1    Oct. 17, 2002

(30) Foreign Application Priority Data

Aug. 25, 2000   (JP) .............................. 2000-254832

(51) Int. Cl.
*H04B 1/38* (2006.01)
(52) U.S. Cl. .............................. 455/575.3; 379/433.13
(58) Field of Classification Search ........... 379/433.13; 455/575.3; 16/342
See application file for complete search history.

(56) References Cited

U.S. PATENT DOCUMENTS

| 5,764,760 A | | 6/1998 | Grandbert et al. ..... 379/433.13 |
| 6,076,232 A | * | 6/2000 | Saida et al. .................... 16/342 |
| 6,148,079 A | * | 11/2000 | Chintala et al. ....... 379/433.13 |

FOREIGN PATENT DOCUMENTS

| EP | 0 765 063 | 3/1997 |
| JP | 10-282209 | 10/1998 |

* cited by examiner

*Primary Examiner*—Ahmad F. Matar
(74) *Attorney, Agent, or Firm*—Brown & Michaels, PC

(57) ABSTRACT

A second connecting portion 22 of a second inside portion 2A is formed with an opening portion 24 extending all the way from an inner peripheral surface of the connecting hole 23 to an outer surface of the connecting portion 22 and towards a second outside portion 2B. This opening portion 24 is set both in size dimension and configuration such that a fitting portion 32a of a hinge pin 32 can be inserted into the connecting hole 23 via the opening portion 24. The second outside portion 2B is formed with a shielding portion 25 for shielding the opening portion 24. The shielding portion 25 is formed with a protruding portion 26 which is brought into the opening portion 24. A distal end face of the protruding portion 26 is generally in contact with the fitting portion 32a.

8 Claims, 3 Drawing Sheets

FOLDABLE TYPE CELLULAR TELEPHONE

TECHNICAL FIELD

This invention relates to a foldable type cellular telephone in which a main body portion and a turnable portion are turnably connected to each other through a hinge.

BACKGROUND ART

In general, a foldable type cellular telephone has a transmitting portion and a receiving portion (either one of them is the main body portion and the other is the turnable portion). The transmitting portion has a receiving hole formed in one end portion thereof, and the receiving portion has a connecting hole formed in one end portion thereof. A hinge main body of a hinge is non-turnably inserted in the receiving hole. One end portion of a hinge pin of the hinge is non-turnably inserted in the connecting hole. The other end portion of the hinge pin is turnably inserted in the hinge main body so that the transmitting portion and the receiving portion are turnably connected to each other through the hinge (see Japanese Patent Application Unexamined Publication No. 2000-110434).

For assembling the conventional foldable type cellular telephone, first, the hinge main body is inserted in the receiving hole. Then, the hinge pin is pushed towards the interior side of the hinge main body against the biasing force of hinge means disposed within the hinge main body, so that the hinge pin is entirely embedded in the hinge main body. After the connecting hole of the receiving portion is brought into an opposing relation to the hinge pin in that state, the hinge pin is moved so as to be projected from the hinge main body by the biasing means. Then, one end portion of the hinge pin is inserted into the connecting hole. By this, the transmitting portion and the receiving portion are turnably connected to each other though the hinge.

However, the conventional foldable type cellular telephone has the following problems. Since the connecting hole must be brought into an opposing relation to the receiving hole while holding the embedded state of the hinge pin in the hinge main body at the time for connecting the transmitting portion to the receiving portion, the hinge pin cannot be inserted into the connecting hole easily. Moreover, the hinge main body becomes longer to the extent that the hinge pin can be brought into and out of the hinge main body and therefore, the hinge becomes large in size. In addition, since the biasing means must be installed within the hinge main body, the number of component parts is increased to that extent, the structure becomes complicated and the manufacturing costs are increased.

DISCLOSURE OF INVENTION

The present invention has been accomplished in order to solve the above problems. According to the present invention, there is provided a foldable type cellular telephone comprising a main body portion and a turnable portion, one ends of the main body portion and the turnable portion being turnably connected to each other through a hinge such that the main body portion and the turnable portion can be turned between a folding position where opposing surfaces of the main body portion and the turnable portion are folded in such a manner as to be contacted with each other and a using position where the opposing surfaces are away from each other, at least either one of the main body portion and the turnable portion including an inside portion and an outside portion which are formed by being bisected along the opposing surfaces, the hinge including a hinge main body and a hinge pin one end portion of which is turnably connected to the hinge main body and the other end portion of which is projected from the hinge main body, one end portion of the remaining one of the main body portion and the turnable portion being formed with a receiving hole for receiving the hinge main body such that the hinge main body cannot be turned, one end portion of the inside portion being formed with a connecting hole into which the other end portion of the hinge pin projecting from the hinge main body is non-turnably inserted, wherein the inside portion is formed with an opening portion formed all the way to an inner peripheral surface of the connecting hole from an outer surface opposing the outside portion so that the other end portion of the hinge pin can be inserted into the connecting hole through the opening portion, and a part of the outside portion corresponding to the opening portion is formed with a shielding portion for shielding the opening portion.

In this case, it is preferred that the shielding portion is formed with a protruding portion which is extended into the opening portion such that a distal end portion of the protruding portion is generally in contact with the hinge pin. It is also preferred that a distal end face of the protruding portion and an inner peripheral surface of the connecting hole corresponding to the distal end face are formed with an engaging portion which is engaged with the other end portion of the hinge pin inserted into the connecting hole so as to fixedly position the hinge pin. Preferably, the engaging portion is in the form of a mountain or a valley.

It is accepted that either one of the main body portion and the turnable portion serves as a transmitting portion and the remaining one serves as a receiving portion.

BEST MODE FOR CARRYING OUT THE INVENTION

The present invention will now be described in the form of one preferred embodiment with reference to FIGS. 1 to 4.

Figure 1:
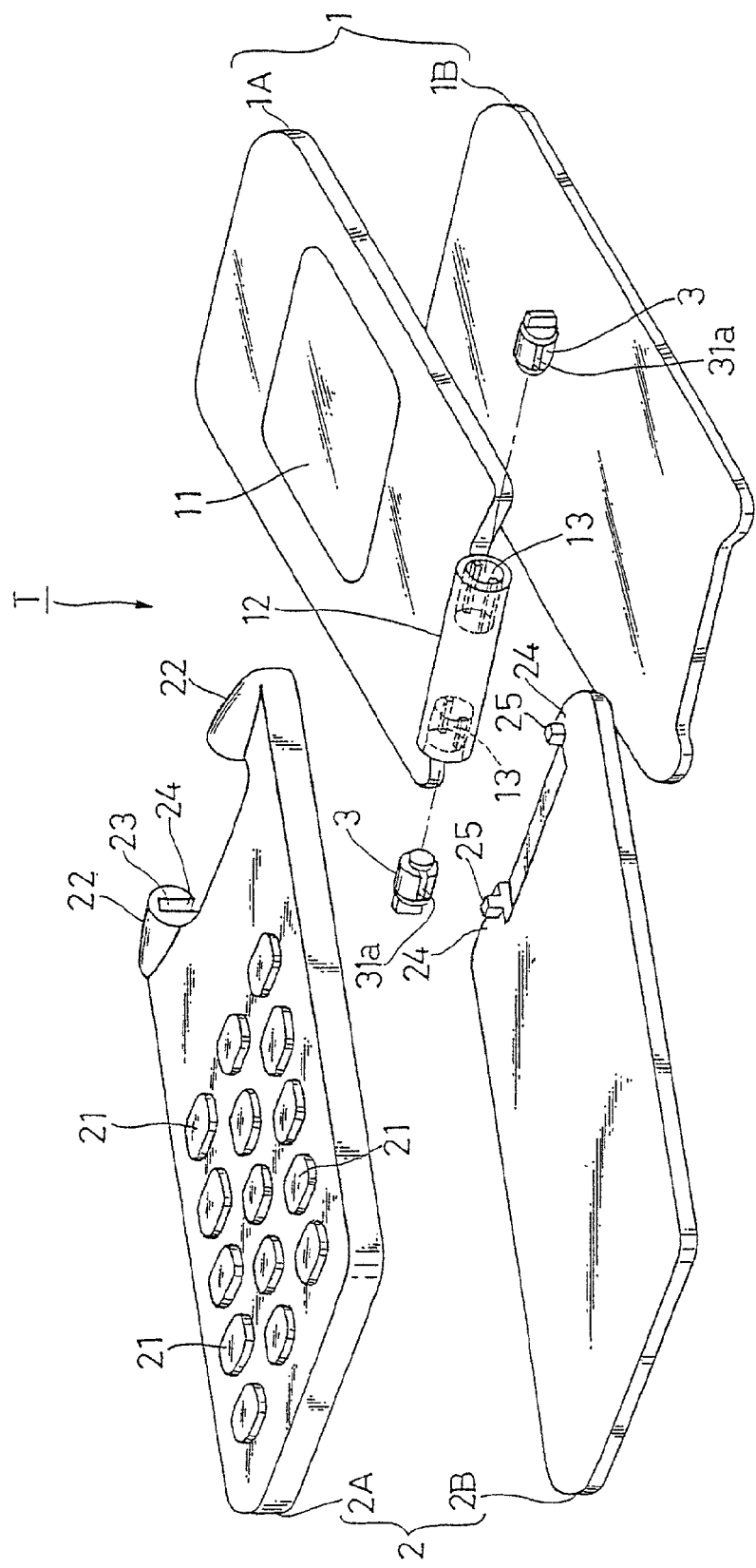
FIG. 1 is an exploded perspective view showing a first embodiment of the present invention.
Figure 2:
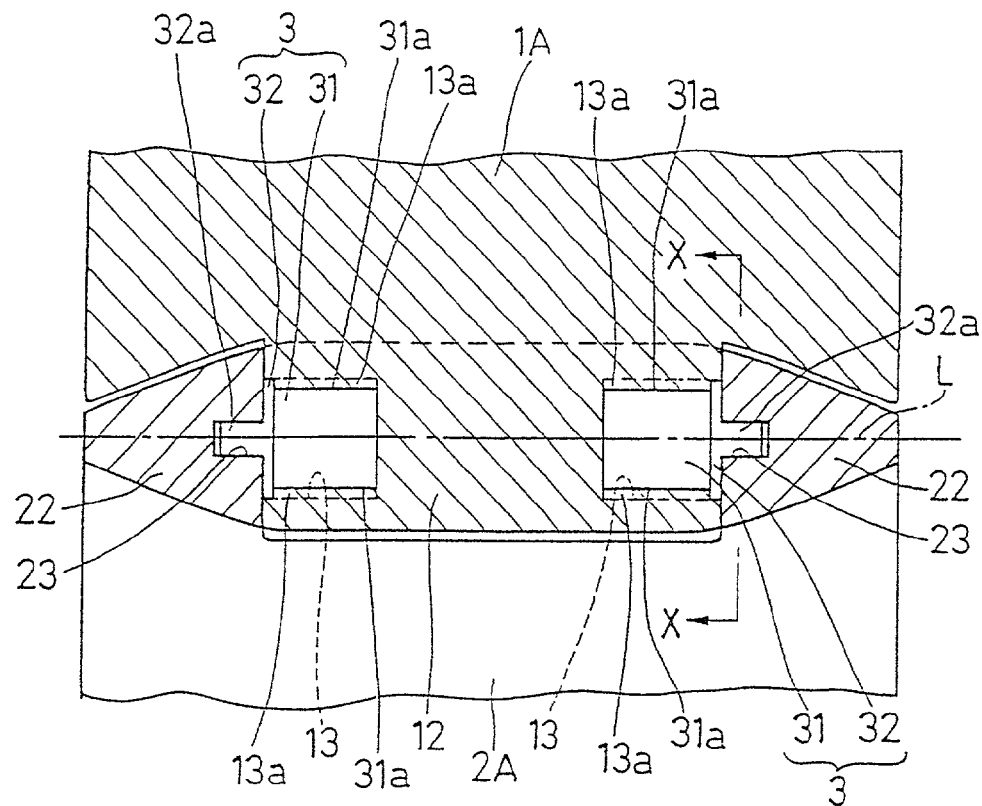
FIG. 2 is a sectional view taken on line Y—Y of FIG. 3, showing only an important portion of the above embodiment.

First, a first embodiment of the present invention will be described with reference to FIGS. 1 to 3. FIG. 1 shows an exploded perspective view of a foldable type cellular telephone T according to the present invention. This cellular telephone T includes a receiving portion (main body portion) 1, a transmitting portion (turnable portion) 2, and two hinges 3, 3 through which one ends of both the receiving portion 1 and transmitting portion 2 are turnably connected to each other. The receiving portion 1 and the transmitting portion 2 are turnably connected to each other about an axis L of the hinge 3 such that the portions 1, 2 can turning move between a folding position where their front faces (opposing faces) are abutted with each other as indicated by imaginary lines of FIG. 3 and a using position (away about 130 degrees from the folding position in a circumferential direction in this embodiment) as indicated by solid lines of FIG. 3.

The receiving portion 1 includes a first inside portion 1A whose front face is abutted with the transmitting portion 2 when the receiving portion 1 is turningly moved to the folding position, and a first outside portion 1B fixed to a back face (the face facing the opposite side of the transmitting portion 2 side) of the first inside portion 1A by fixing means (not shown) such as a screw. The first inside portion 1A is provided at its front face portion with a liquid crystal display portion 11. The first outside portion 1B is provided with an integral circuit (not shown), etc.

The transmitting portion 2 includes a second inside portion (inside portion) whose front face is abutted with the receiving portion 1 in the folding position, and a second outside portion (outside portion) 2B fixed to its back face portion by fixing means (not shown) such as a screw. The second inside portion 2A is provided at its front face portion with push buttons 21 for inputting numerical figures, characters, symbols, and other control members (not shown). The second outside portion 1B is provided with an integral circuit (not shown), etc.

The first inside portion 1A has a first connecting portion 12 of a circular configuration in section formed on its first end portion (the end portion on the transmitting portion 2 side). The length of the first connecting portion 12 is shorter than the width of the first inside portion 1A. The first connecting portion 12 is arranged at a central portion in a width direction of the first inside portion 1A. Moreover, the first connecting portion 12 is arranged such that its axis is in alignment with the axis L of the hinge 3. The first connecting portion 12 has receiving holes 13 formed in its opposite end faces and extending on the axis L. Although the receiving hole 13 is circular in section in this embodiment, the configuration of the hole 13 is not limited to this. It may be of any suitable non circular configuration in section such as, for example, square in section. A key portion 13a is formed on an inner peripheral surface of the receiving hole 13. Instead of this key portion 13a, a key groove may be formed. In the case where the receiving hole 13 is formed in a non-circular configuration in section, there is no need of a provision of the key portion 13a nor the key groove.

The second inside portion 2A has two connecting portions 22 of a circular configuration in section formed on its one end portion (the end portion on the receiving portion 1 side). The second connecting portions 22, 22 are arranged at opposite end portion in a width direction of the second inside portion 2A with each of their axes aligned with the axis L. An interval between the two second connecting portions 22, 22 is generally equal to the length of the first connecting portion 12. The first connecting portion 12 is inserted between the second connecting portions 22, 22. A connecting hole 23 extending on the axis L is formed in an opposing surface of the second connecting portion 22 with respect to the first connecting portion 12. Although the connecting hole 23 is formed in a rectangular configuration in section in this embodiment, it may be of any other non-circular configuration in section.

The hinge 3 for turnably connecting the receiving portion 1 and the transmitting portion 2 together includes a hinge main body 31 and a hinge pin 32. The hinge main body 31 is formed in a circular configuration in section and engaged with the receiving hole 13. Moreover, the key portion 13a is brought into engagement with a key groove 31a formed in an outer peripheral surface of the hinge main body 31. By this, the hinge main body 31 is non-turnably engaged with the receiving hole 13. Of course, in the case where the receiving hole 13 and the hinge main body 31 are formed in a non-circular configuration in section, there is no need of a provision of the key portion 13a nor the key groove 31a.

On the other hand, the hinge pin 32 is arranged such that its axis is in alignment with the axis L. One end portion of the hinge pin 32 is turnably inserted in the hinge main body 31. The other end portion of the hinge pin 32 is projected outside from the hinge main body 31 and has a fitting portion 32a formed thereon. This fitting portion 32a has a generally identical configuration in section with the connecting hole 23 and is non-turnably fitted to the connecting hole 23. By this, the receiving portion 1 and the transmitting portion 2 are turnably connected to each other through the hinges 3, 3.

Figure 3:
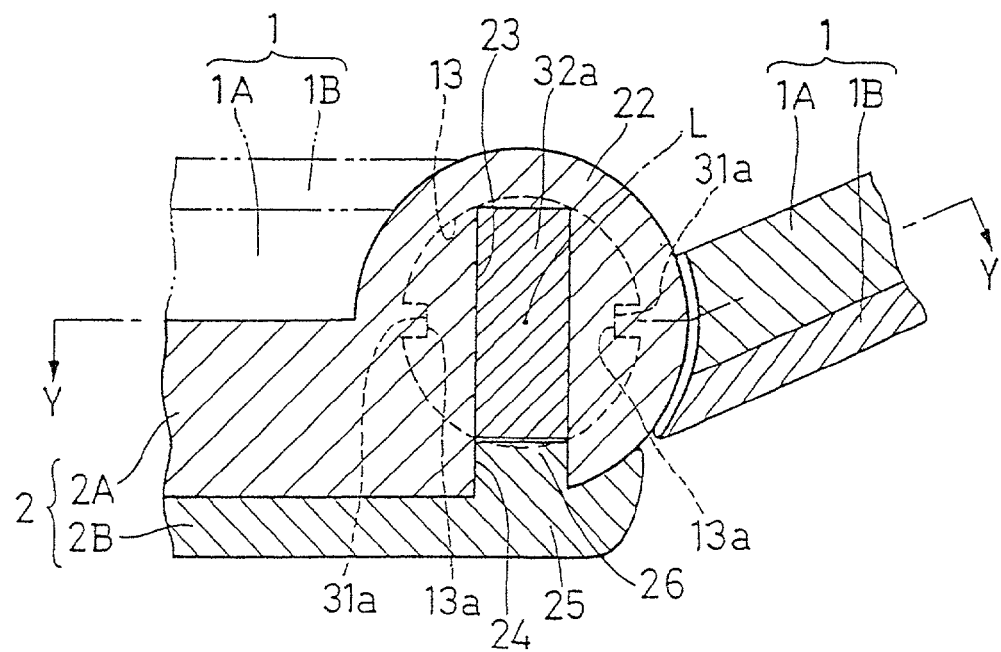
FIG. 3 is an enlarged sectional view taken on line X—X of FIG. 2.

As shown in FIGS. 1 and 3, an opening portion 24 is formed in the second connecting portion 22. This opening portion 24 extends towards the second outside portion 2B side from the inner peripheral surface of the connecting hole 23 and reaches the outer surface of the second connecting portion 22. Moreover, the opening portion 24 has a length and a width generally equal to those of the connecting hole 23. Accordingly, the opening portion 24 allows the fitting portion 32a of the hinge pin 32 to pass therethrough in a direction orthogonal to the axis L. The fitting portion 32a can be inserted into the connecting hole 23 via the opening portion 24.

The second outside portion has a shielding portion 25 formed on its portion opposing the second connecting portion 22. This shielding portion 25 is adapted to shield the opening portion 24 so that the opening portion 24 cannot be seen visually from outside. The shielding portion 25 has a protruding portion 26 formed in its opposing surface with respect to the opening portion 24. The protruding portion 26 is engageable with the opening portion 24. The protruding portion 26 is set in height such that its distal end face is generally contacted with the fitting portion 32a of the hinge pin 32.

In the foldable type cellular telephone T thus constructed, in the case where the receiving portion 1 and the transmitting portion 2 are connected to each other through the hinge 3, the second inside portion 2A and the second outside portion 2B are separated from each other beforehand. The first inside portion 1A and the first outside portion 1B may be fixed to each other beforehand, or they may be fixed after connection between the receiving portion 1 and the transmitting portion 2. Then, the hinge main body 31 of each hinge 3 is inserted into the receiving hole 13. Thereafter, the attitudes and positions of the receiving portion 1 and the first inside portion 1A are adjusted such that the fitting portion 32a of the hinge pin 32 is moved in a direction orthogonal to the axis L so as to be inserted into the opening portion 24. In this embodiment, in the case where an angle formed between the receiving portion 1 and the second inside portion 2A is made generally equal to an angle likewise formed therebetween in the using position, the fitting portion 32a can be inserted into the opening portion 24. It is, of course, accepted that the fitting portion 32a can be inserted into the opening portion 24 at any other angle than the above-mentioned angle. Subsequently, the fitting portion 32a is inserted into the opening portion 24 and then further inserted into the connecting hole 23 from the opening portion 24. Thereafter, the second outside portion 2B is fixed to the back face of the second inside portion 2A. Then, the shielding portion 25 shields the opening portion 24 so that the opening portion 24 cannot be seen visually from outside. Moreover, the protruding portion 26 is brought into the opening portion 24 and generally contacted with the fitting portion 32a. By this, the fitting portion 32a is prohibited from moving in a direction for connecting the connecting hole 23 and the opening portion 24 together and hence, the receiving portion 1 and the transmitting portion 2 are prohibited from playing in the same direction.

As seen in the foregoing, according to this foldable type cellular telephone T, at the time for bringing the fitting portion 32a of the hinge pin 32 into the connecting hole 23, the fitting portion 32a of the hinge pin 32 can be inserted into the connecting hole 23 from the opening portion 24 merely by moving the hinge pin 32 in the direction orthogonal to the axis L. Accordingly, it is no more required to make the hinge pin 32 embedded in the hinge main body 31. Thus, the fitting portion 32a of the hinge pin 32 can easily be inserted into the connecting hole 23. Since the hinge pin 32 is no more required to be embedded in the hinge main body 31, the length of the hinge main body 31 can be reduced to that extent and therefore, the entire hinge 3 can be made smaller in size. Moreover, since no biasing means for biasing the hinge pin 32 in a direction protruding from the hinge main body 31 is required, the number of component parts can be reduced to that extent and the hinge structure can be simplified. Moreover, its manufacturing cost can be reduced. The transmitting portion 2 is bisected into a second inside portion and a second outside portion even in the conventional cellular telephones. Accordingly, the present invention can easily be applied to those conventional cellular telephones only with a small design change in which the opening portion 24 and the protruding portion 26 are formed.

Figure 4:
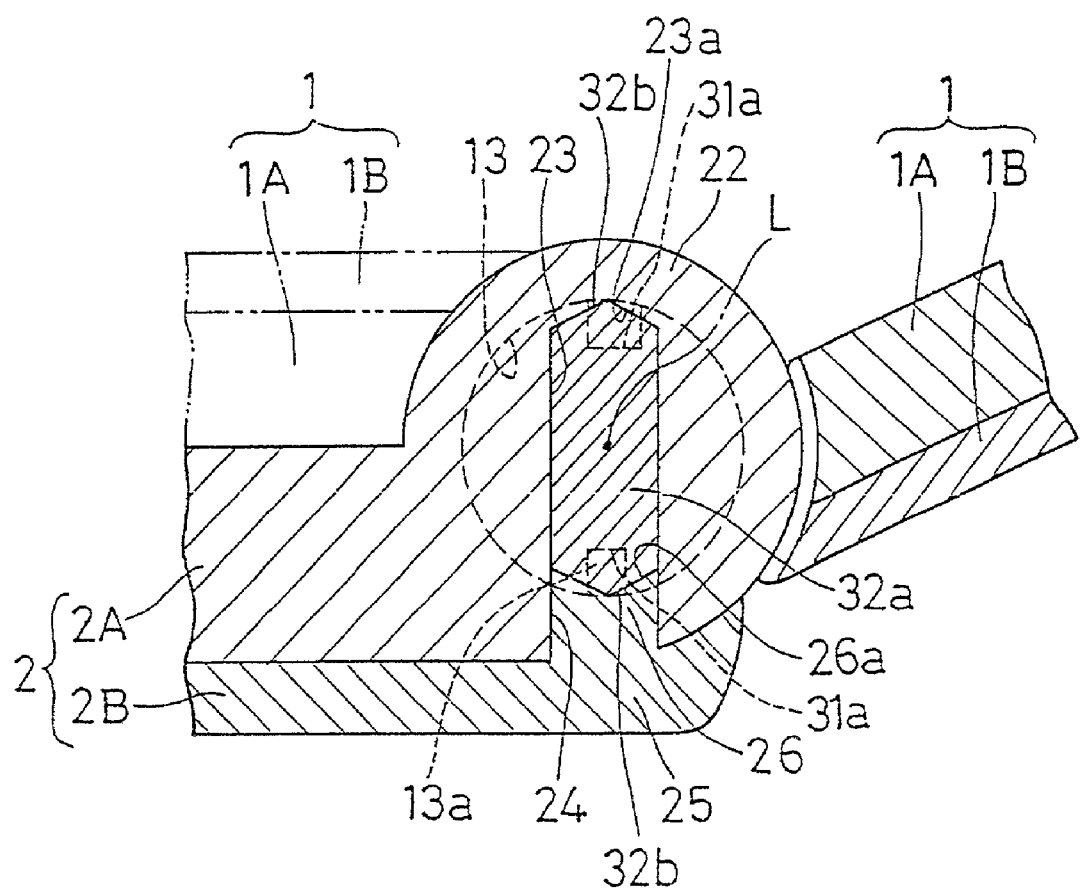
FIG. 4 is a sectional view, like FIG. 3, showing a second embodiment of the present invention.

A second embodiment of the present invention will now be described with reference to FIG. 4. In this second embodiment, a side portion of the engaging portion 24 facing an opening portion 24 and another side portion opposing thereto are formed with mountain portions (engaging portions) 32b, 32b composed of two inclination surfaces. The mountain portions 32b, 32b are formed such that a line connecting their apexes together is orthogonal to an axis L. The mountain portions 32b, 32b are laterally symmetrically arranged with respect to the line and point symmetrically arranged with respect to the axis L. The side portion of the connecting hole 23 opposing one of the mountain portions 32b is formed with a valley portion (engaging portion) 23a of a configuration identical with the mountain portion 32b. A distal end face of a protruding portion 26 opposing the other mountain portion 32b is also formed with a valley portion (engaging portion) of a configuration identical with the mountain portion 32b. When the protruding portion 26 is brought into engagement with the opening portion 24 after the fitting portion 32a is inserted into the connecting hole 23, the valley portions 23a, 26a sandwichingly hold the mountain portions 32b, 32b. As a result, the valley portions 23a, 26a are engaged with the mountain portions 32b, 32b, respectively, the fitting portion 32a is unmovably restrained with respect to a direction for connecting the mountain portions 32b, 32b and a direction orthogonal to the direction for connecting the mountain portions 32b, 32b and received in the connecting hole 23 with no play. Any other configuration of the mountain portion 32b and the valley portions 23a, 26a is accepted as long as the protruding portion 26 can be received in the connecting hole 23 with no play when the mountain portions 32b, 32b and the valley portions 23a, 26a are engaged with each other. It is also accepted that a valley portion (engaging portion) is formed on the fitting portion 32a, and the mountain portion (engaging portion) is formed on the connecting hole 23 and the protruding portion 26.

It should be noted that the present invention is, by no means, limited to the above embodiments, and many changes and modifications can be made in accordance with necessity.

For example, although the receiving portion 1 serves as a main body portion and the transmitting portion 2 serves as a turnable portion in the above embodiments, the reverse arrangement is also accepted in which the receiving portion 1 serves as a turnable portion and the transmitting portion 2 serves as a main body portion.

Similarly, although the receiving hole 13 is formed in the receiving portion 1 and the connecting hole 23 is formed in the transmitting portion 2, it is also accepted that the connecting hole 23 is formed in the receiving portion 1 and the receiving hole 13 is formed in the transmitting portion 2. The receiving portion 1 with the receiving hole 13 is not necessarily bisected into the inside portion 1A and the outside portion 1B. Accordingly, in the case where the receiving hole 13 is formed in the transmitting portion 2, the transmitting portion 2 is not required to be bisected into the inside portion 2A and the outside portion 2B. Instead, they may be integrally formed as a whole.

Moreover, with respect to play of the receiving portion 1 and the transmitting portion 2 in the direction for connecting the connecting hole 23 and the opening portion 24 together, they are not necessarily required to be restrained by the protruding portion 26. Instead, the play of the receiving portion 1 and the transmitting portion 2 in the direction for connecting the hole 23 and the portion 24 may be restrained by any other suitable member. In that case, there is no need of a provision of the protruding portion 26.

INDUSTRIAL APPLICABILITY

According to the present invention, the transmitting portion and the receiving portion can easily be connected to each other in a foldable type cellular telephone in which the transmitting portion and the receiving portion are turnably connected through a hinge.

The invention claimed is:

1. A foldable type cellular telephone comprising a main body portion and a turnable portion, one end of said main body portion being connected to the opposing end of said turnable portion through a hinge such that said main body portion and said turnable portion can be turned between a folding position and a using position, in said folding position, said main body portion and said turnable portion being folded such that opposing surfaces of said main body portion and said turnable portion is contacted with each other, in said using position, said opposing surfaces being away from each other, at least selected one of said main body portion and said turnable portion including an inside portion and an outside portion which are connected with each other along said opposing surfaces, said hinge including a hinge main body and a hinge pin, one end portion of said hinge pin being turnably connected to said hinge main body, the other end portion of said hinge pin being projected from said hinge main body, one end portion of the remaining one of said main body portion and said turnable portion being formed with a receiving hole for receiving said hinge main body such that said hinge main body cannot be turned, one end portion of said inside portion being formed with a connecting hole into which the other end portion of said hinge pin projecting from said hinge main body is non-turnably inserted, wherein said inside portion is formed with an opening portion extending from an inner peripheral surface of said connecting hole in a radial direction of said connecting hole to an outer surface opposing said outside portion so that in a state that one end portion of said hinge pin is connected to said hinge main body which is received in said receiving hole, the other end portion of said hinge pin can be inserted into said connecting hole in the radial direction of said connection hole through said opening portion, and a part of said outside portion corresponding to said opening portion is formed with a shielding portion for shielding said opening portion.

2. A foldable type cellular telephone according to claim 1, wherein said shielding portion is formed with a protruding portion which is extended into said opening portion such that a distal end portion of said protruding portion is generally in contact with an outer peripheral surface of the other end portion of said hinge pin.

3. A foldable type cellular telephone according to claim 2, wherein a distal end face of said protruding portion and an inner peripheral surface of said connecting hole corresponding to said distal end face are formed with an engaging portion which is engaged with an outer peripheral surface of the other end portion of said hinge pin inserted into said connecting hole so as to fixedly position said hinge pin.

4. A foldable type cellular telephone according to claim 3, wherein said engaging portion is in the form of a mountain or a valley.

5. A foldable type cellular telephone according to claim 1, wherein either one of said main body portion and said turnable portion serves as a transmitting portion and the remaining on serves as a receiving portion.

6. A foldable type cellular telephone according to claim 2, wherein either one of said main body portion and said turnable portion serves as a transmitting portion and the remaining on serves as a receiving portion.

7. A foldable type cellular telephone according to claim 3, wherein either one of said main body portion and said turnable portion serves as a transmitting portion and the remaining on serves as a receiving portion.

8. A foldable type cellular telephone according to claim 4, wherein either one of said main body portion and said turnable portion serves as a transmitting portion and the remaining on serves as a receiving portion.

* * * * *

UNITED STATES PATENT AND TRADEMARK OFFICE
CERTIFICATE OF CORRECTION

| | |
|---|---|
| PATENT NO. | : 7,076,280 B2 |
| APPLICATION NO. | : 10/110925 |
| DATED | : July 11, 2006 |
| INVENTOR(S) | : Oshima, Kazuyoshi |

Page 1 of 1

It is certified that error appears in the above-identified patent and that said Letters Patent is hereby corrected as shown below:

Column 8:

Line 7, replace the word "on" with the word "one"

Line 11, replace the word "on" with the word "one"

Line 15, replace the word "on" with the word "one"

Line 19, replace the word "on" with the word "one"

Signed and Sealed this

Fifth Day of September, 2006

JON W. DUDAS
*Director of the United States Patent and Trademark Office*